United States Patent
Gardner et al.

(10) Patent No.: US 12,248,854 B2
(45) Date of Patent: Mar. 11, 2025

(54) ROBUST MODEL PERFORMANCE ACROSS DISPARATE SUB-GROUPS WITHIN A SAME GROUP

(71) Applicant: Google LLC, Mountain View, CA (US)

(72) Inventors: Joshua Patrick Gardner, Seattle, WA (US); Wei Huang, Kirkland, WA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 17/434,849

(22) PCT Filed: Sep. 30, 2020

(86) PCT No.: PCT/US2020/053378
§ 371 (c)(1),
(2) Date: Aug. 30, 2021

(87) PCT Pub. No.: WO2022/071929
PCT Pub. Date: Apr. 7, 2022

(65) Prior Publication Data
US 2023/0222377 A1    Jul. 13, 2023

(51) Int. Cl.
*G06N 20/00*    (2019.01)
(52) U.S. Cl.
CPC ................... *G06N 20/00* (2019.01)
(58) Field of Classification Search
CPC ..................................... G06N 20/00
See application file for complete search history.

(56) References Cited

U.S. PATENT DOCUMENTS

| | | | |
|---|---|---|---|
| 12,026,624 B2 * | 7/2024 | Gonzalez | G06N 3/082 |
| 2014/0180760 A1 * | 6/2014 | Karatzoglou | G06Q 30/0269 |
| | | | 705/7.29 |
| 2016/0232575 A1 | 8/2016 | Kirti et al. | |

(Continued)

FOREIGN PATENT DOCUMENTS

| | | |
|---|---|---|
| CN | 107563567 | 1/2018 |
| CN | 107679920 | 2/2018 |

(Continued)

OTHER PUBLICATIONS

Office Action in Indian Appln. No. 202127037823, dated Jul. 27, 2023, 10 pages (with English translation).
International Search Report and Written Opinion in International Appln. No. PCT/US2020/053378, dated Jun. 29, 2021, 20 pages.
Sarafianos et al., "Deep imbalances attribute classification using visual attention aggregation," Cornell University Library, Jul. 11, 2018, 19 pages.

(Continued)

*Primary Examiner* — David E Choi
(74) *Attorney, Agent, or Firm* — Fish & Richardson P.C.

(57) ABSTRACT

Methods, systems, and apparatus, including computer programs encoded on a computer storage medium, for reducing the difference in performance of a model across groups and sub-groups within the same group of users with similar characteristics for providing digital components. Methods can include identifying, a loss function that generates a loss representing a measure of performance the model seeks to optimize during training. The loss function is modified by adding an additional term to the loss function. The model is trained using the modified loss function. A request for digital component is received that includes a user group identifier. The model generates one or more user characteristics based on which one or more digital components are selected and transmitted to the client device of the user.

20 Claims, 4 Drawing Sheets

(56) References Cited

U.S. PATENT DOCUMENTS

| | | | | |
|---|---|---|---|---|
| 2020/0285943 | A1* | 9/2020 | Perera | G06N 3/048 |
| 2022/0046301 | A1* | 2/2022 | Palczewski | H04N 21/2407 |
| 2022/0128988 | A1* | 4/2022 | Sawada | G05B 13/02 |
| 2022/0262105 | A1* | 8/2022 | Zhou | G06N 3/088 |
| 2022/0343178 | A1* | 10/2022 | Hall | G06N 3/08 |
| 2023/0050120 | A1* | 2/2023 | Onoro-Rubio | G06V 40/1365 |
| 2023/0142351 | A1* | 5/2023 | M | G06F 16/148 |
| | | | | 707/737 |

FOREIGN PATENT DOCUMENTS

| | | |
|---|---|---|
| CN | 110520871 | 11/2019 |
| JP | 2018-142294 | 9/2018 |
| WO | WO 2020070834 | 9/2021 |

OTHER PUBLICATIONS

Yang et al., "Class-balanced deep neural network for automatic ventricular structure segmentation," International Conference on Image Analysis and Processing, Mar. 15, 2018, pp. 152-159.

Notice of Allowance in Japanese Appln. No. 2021-553092, dated Jan. 16, 2023, 5 pages (with English translation).

International Preliminary Report on Patentability in International Appln. No. PCT/US2020/053378, mailed on Apr. 13, 2023, 14 pages.

Office Action in Chinese Appln. No. 202080019637.9, mailed on Dec. 7, 2024, 17 pages (with English translation).

\* cited by examiner

ROBUST MODEL PERFORMANCE ACROSS DISPARATE SUB-GROUPS WITHIN A SAME GROUP

CROSS-REFERENCE TO RELATED APPLICATION

This application is a National Stage Application under 35 U.S.C. § 371 and claims the benefit of International Application No. PCT/US2020/053378, filed Sep. 30, 2020. The disclosure of the foregoing application is hereby incorporated by reference in its entirety.

BACKGROUND

This specification relates to data processing and machine learning models.

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/platform.

SUMMARY

In general, one innovative aspect of the subject matter described in this specification can be embodied in methods including the operations of identifying, for a model to be trained, a loss function that generates a loss representing a measure of performance the model seeks to optimize during training; modifying the loss function, including adding an additional term to the loss function that reduces differences in the measure of performance across different subgroups of users that are all represented by a same user group identifier, wherein each user subgroup among the different subgroups of users has a characteristic that differs from characteristics of other subgroup among the different subgroups of users; training the model using the modified loss function; receiving, from a client device, a request for a digital component, the request including a given user group identifier for a particular user group among the different groups of users; generating, by applying the trained model to information included in the request, one or more user characteristics that are not included in the request; selecting one or more digital components based on the one or more user characteristics generated by the trained model; and transmitting, to the client device, the selected one or more digital components.

Other implementations of this aspect include corresponding apparatus, systems, and computer programs, configured to perform the aspects of the methods, encoded on computer storage devices. These and other implementations can each optionally include one or more of the following features.

In some aspects modifying the loss function includes adding an error regularization term to the loss function. In some aspects modifying the loss function includes adding a divergence minimization term to the loss function.

In some aspects adding an error regularization term to the loss function includes adding a loss variance term to the loss function, wherein the loss variance function is characterizing a squared difference between the average loss of the model within a user group based on some attribute, and the average loss of the model across all users, and wherein the difference may be computed separately across users based on a distinct attribute.

In some aspects, adding an error regularization term to the loss function includes adding a maximum weighted loss discrepancy term to the loss function, wherein the maximum weighted loss discrepancy term is the maximum weighted difference between loss in a user group and all users in all the different groups of users, the method further including using a function that quantifies an importance of each user group.

In some aspects adding an error regularization term to the loss function includes adding a coarse loss variance term to the loss function, wherein the coarse loss variance term is an average of squared difference between loss of the first user group and the second user group, conditional on a separate user attribute.

In some aspects adding an error regularization term to the loss function includes adding a HSIC regularization term to the loss function, wherein the HSIC term characterizes a difference in loss across different groups of users in a non-parametric way and independent of a distribution of users in the different groups of users.

In some aspects adding a divergence minimization term to the loss function includes adding one of a mutual information term or a Kullback-Leibler Divergence term to the loss function, wherein the mutual information term characterizes a similarity of the distributions of the model predictions across multiple groups of users and wherein the Kullback-Leibler Divergence term characterizes a difference in a distributions of model predictions across multiple groups of users.

Particular embodiments of the subject matter described in this specification can be implemented so as to realize one or more of the following advantages. Machine learning models can be trained to predict user characteristics, instead of collecting certain information from the users, e.g., via third party cookies thereby respecting privacy concerns of the users. However implementing such methods require training the machine learning models over unbalanced datasets acquired from real world users resulting in more frequently-observed subgroups having a higher degree of influence over the models' parameters, relative to less frequently-observed subgroups. This can result in considerable variations in model performance across subgroups. Modifying the loss function of the machine learning model enables the machine learning model to learn and distinguish between the intricate patterns of the training dataset, thereby reducing errors in predictions regarding the user characteristics and increasing consistency of the machine learning model's predictive accuracy across subgroups. Such implementations allow delivery of finely selected digital components based on the predicted user characteristics to the user thereby improving user experience and maintaining user privacy.

Embodiments of the subject matter described herein can reduce the amount of potentially sensitive data being transmitted between a client device and the rest of the network. For example, in the case of a client device sending a request for a digital component where the group identifier for the user indicates a less-observed subgroup, the methods described herein can avoid the need to send more information about a user in order to suitably tailor the content served to the user. The reduction in additional data provided by a client device about a user reduces the bandwidth requirements for client devices which send requests for users of less-observed subgroups. Such a reduction may be more significant for sub-groups which are less-observed due to factors which are concordant with sensitive bandwidth requirements (for example, less-observed sub-groups may be found more often where local network connectivity is poor). Furthermore, by avoiding the transmission of additional information, less-observed subgroups may be protected from identification by third parties.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
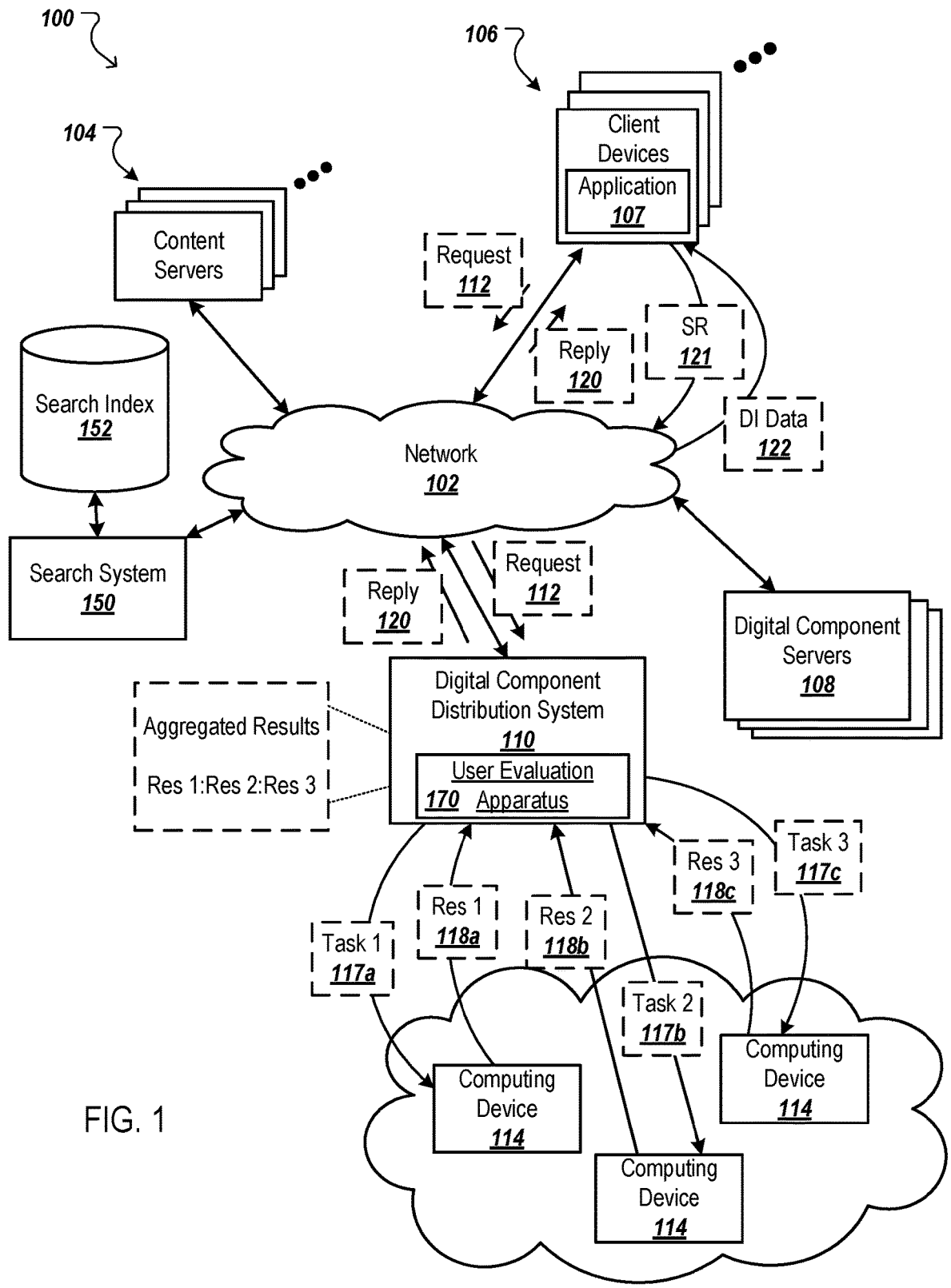
FIG. 1 is a block diagram of an example environment in which digital components are distributed.

This document discloses methods, systems, apparatus, and computer readable media that are used to modify machine learning models to ensure that model performance varies as little as possible across different subgroups of users within a same user group.

In general, users connected to the internet via client devices can be provided with digital components. In such scenarios, the digital component provider may wish to provide digital components based on the user's online activity and user browsing history. However, more and more users are opting out of allowing certain information to be collected and used, and third-party cookies are being blocked and/or deprecated by some browsers, such that digital component selection must be performed without the use of third-party cookies (i.e., cookies from a domain that differs from the domain of the web page permitted to access the contents of the cookie file).

New techniques have emerged that distribute digital components to users, by assigning the users to user groups when the users visit particular resources or perform particular actions at the resource (e.g., interact with a particular item presented on a web page or add the item to a virtual cart). These user groups are generally created in a manner such that each user group includes a sufficient number of users, such that no individual user can be identified. Demographic information regarding the user still remains important for providing users with personalized online experiences, e.g., by providing specific digital components that are relevant to the users. However, due to unavailability of such information, machine learning models can be implemented that can predict such user information and/or characteristics.

Even though such techniques and methods are state-of-the-art, machine learning models can suffer greatly due to unbalanced dataset. Since standard techniques for training machine learning models (such as empirical risk minimization, which seeks to minimize the average loss over the training data) are agnostic regarding the class distribution of the training dataset, learning from such datasets results in a degradation of model performance. For example, a machine learning model aimed to predict user attributes and trained on an unbalanced dataset may perform poorly and result in substantial number of mismatches between users' true attributes and the models' predictions.

In contrast, the techniques and methods explained in this document excel over traditional techniques by modifying the loss function in a way that achieves high accuracy in predicting user characteristics, thereby enabling the selection of relevant digital components for the user using the output of the machine learning model. More specifically, the loss function of the machine learning model to be trained is modified to include an additional term that reduces differences in the measure of performance within or across different subgroups and/or subset of users that are all represented by the same user group identifier (i.e., are all included in a same larger group of users), despite the fact that each of these different subgroups of users have a characteristic that differs from characteristics of other subgroups of users among the different subgroups of users within the user group. This added term ensures the robustness of the performance of the model across different subgroups of users. The techniques and methods are further explained with reference to FIG. 1-4.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects content servers 104, client devices 106, digital component servers 108, and a digital component distribution system 110 (also referred to as a component distribution system (CDS)).

A client device 106 is an electronic device that is capable of requesting and receiving resources over the network 102. Example client devices 106 include personal computers, mobile communication devices, wearable devices, personal digital assistants, and other devices that can send and receive data over the network 102. A client device 106 typically includes a user application 112, such as a web browser, to facilitate the sending and receiving of data over the network 102, but native applications executed by the client device 106 can also facilitate the sending and receiving of data over the network 102. Client devices 106, and in particular personal digital assistants, can include hardware and/or software that enable voice interaction with the client devices 106. For example, the client devices 106 can include a microphone through which users can submit audio (e.g., voice) input, such as commands, search queries, browsing instructions, smart home instructions, and/or other information. Additionally, the client devices 106 can include speakers through which users can be provided audio (e.g., voice) output. A personal digital assistant can be implemented in any client device 106, with examples including wearables, a smart speaker, home appliances, cars, tablet devices, or other client devices 106.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by content servers 104. For example, the content servers 104 can include servers that host publisher websites. In this example, the client device 106 can initiate a request for a given publisher webpage, and the content server 104 that hosts the given publisher webpage can respond to the request by sending machine executable instructions that initiate presentation of the given webpage at the client device 106.

In another example, the content servers 104 can include app-servers from which client devices 106 can download apps. In this example, the client device 106 can download files required to install an app at the client device 106, and then execute the downloaded app locally. The downloaded app can be configured to present a combination of native content that is part of the application itself, as well as one or more digital components (e.g., content created/distributed by a third party) that are obtained from a digital component server 108, and inserted into the app while the app is being executed at the client device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or the digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The digital component request 112 can include event data specifying features such as a name (or network location) of a server from which media is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The digital component request 112 can include event data specifying other event features, such as the electronic document being requested and characteristics of locations of the electronic document at which digital component can be presented. For example, event data specifying a reference (e.g., Uniform Resource Locator (URL)) to an electronic document (e.g., webpage or application) in which the digital component will be presented, available locations of the electronic documents that are available to present digital component, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital component that are eligible for presentation with the electronic document. The event data can also include a search query that was submitted from the client device 106 to obtain a search results page and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The digital component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital component in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented.

In some implementations, the digital component distribution system 110 is implemented in a distributed computing system that includes, for example, a server and a set of multiple computing devices 114 that are interconnected and identify and distribute digital components in response to component requests 112. The set of multiple computing devices 114 operate together to identify a set of digital components that are eligible to be presented in the electronic document from among a corpus of potentially millions of available digital components.

In some implementations, the digital component distribution system 110 implements different techniques for selecting and distributing digital components. For example, digital components can include a corresponding distribution parameters that contribute to (e.g., condition or limit) the selection/distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In another example, the distribution parameters for a particular digital component can include distribution keywords that must be matched (e.g., by electronic documents, document keywords, or terms specified in the component request 112) in order for the digital components to be eligible for presentation. The distribution parameters can also require that the component request 112 include information specifying a particular geographic region (e.g., country or state) and/or information specifying that the component request 112 originated at a particular type of client device 106 (e.g., mobile device or tablet device) in order for the component item to be eligible for presentation. The distribution parameters can also specify an eligibility value (e.g., rank, score or some other specified value) that is used for evaluating the eligibility of the component item for selection/distribution/transmission (e.g., among other available digital components), as discussed in more detail below. In some situations, the eligibility value can be based on an amount that will be submitted when a specific event is attributed to the digital component item (e.g., presentation of the digital component).

The identification of the eligible digital components can be segmented into multiple tasks 117a-117c that are then assigned among computing devices within the set of multiple computing devices 114. For example, different computing devices in the set 114 can each analyze a different digital components to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital component items that are eligible for distribution in response to the component request and/or a subset of the digital components that have certain distribution parameters. The identification of the subset of digital components can include, for example, comparing the event data to the distribution parameters, and identifying the subset of digital component having distribution parameters that match at least some features of the event data.

The digital component distribution system 110 aggregates the results 118a-118c received from the set of multiple computing devices 114 and uses information associated with the aggregated results to select one or more digital components that will be provided in response to the component request 112. For example, the digital component distribution system 110 can select a set of winning digital components (one or more digital components) based on the outcome of one or more digital component evaluation processes. In turn, the digital component distribution system 110 can generate and transmit, over the network 102, reply data 120 (e.g., digital data representing a reply) that enable the client device 106 to integrate the set of winning digital component into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a URL) and a script that causes the client device 106 to transmit a server request (SR) 121 to the digital component server 108 to obtain a given winning digital component from the digital component server 108. In response to the server request 121, the digital component server 108 will identify the given winning digital component specified in the server request 121 and transmit, to the client device 106, digital component data 122 (DI Data) that presents the given winning digital component in the electronic document at the client device 106.

In some implementations, distribution parameters for digital component distribution may include user characteristics such as demographic information, user interests, and/or other information that can be used to personalize the user's online experience. In some situations, these characteristics and/or information regarding the user of the client device 106 is readily available. For example, content platforms such as the content server 104 or the search system 150 may allow the user to register with the content platform by providing such user information. In another example, the content platform can use cookies to identify client devices, which can store information about the user's online activity and/or user characteristics.

These and other methods of identifying user characteristics are becoming less prevalent in an effort to protect user privacy. To protect user privacy, the users can be assigned to one or more user groups based on the digital content accessed by the user during a single browsing session. For example, when the user visits a particular website and interacts with a particular item presented on the website or adds an item to a virtual cart, the user can be assigned to a group of users who have visited the same website or other websites that are contextually similar, or are interested in the same item. For example, if the user of the client device 106 searches for shoes and visits multiple webpages of different shoe manufacturers, the user can be assigned to the user group "shoe," which can include identifiers for all users who have visited websites related to shoes. Thus, the user groups can represent interests of the users in the aggregate without identifying the individual users and without enabling any individual user to be identified. For example, the user groups can be identified by a user group identifier that is used for every user in the group. As an example, if a user adds shoes to a shopping cart of an online retailer, the user can be added to a shoes user group having a particular identifier, which is assigned to every user in the group.

In some implementations, a user's group membership can be maintained at the user's client device 106, e.g., by a browser-based application, rather than by a digital component provider or by a content platform, or by another party. The user groups can specified by a respective user group identifier. The user group identifier for a user group can be descriptive of the group (e.g., gardening group) or a code that represents the group (e.g., an alphanumeric sequence that is not descriptive).

In situations when user characteristics (e.g., beyond the group identifier) are not available, the digital component distribution system 110 can include a user evaluation apparatus 170 that predicts user characteristics based on available information. In some implementations, the user evaluation apparatus 170 implements one or more machine learning models that predict one or more user characteristics based on information included in the component request 112 (e.g., group identifier).

For example, if a user of the client device 106 uses a browser-based application 107 to load a website that includes one or more digital component slots, the browser-based application 107 can generate and transmit component request 112 for each of the one or more digital component slots. The component request 112 includes the user group identifier(s) corresponding to the user group(s) that includes an identifier for the client device 106, other information such as geographic information indicating a state or region from which the component request 112 was submitted, or other information that provides context for the environment in which the digital component 112 will be displayed (e.g., a time of day of the component request, a day of the week of the component request, a type of client device 106 at which the digital component will be displayed, such as a mobile device or tablet device).

The digital component distribution system 110, after receiving the component request 112, provides the information included in the component request 112 as input to the machine learning model. The machine learning model, after processing the input, generates an output including a prediction of one or more user characteristics that were not included in the component request 112. These one or more user characteristics along with other information included in the component request can be used to fetch digital components from the digital component server 108. Generating the predicted output of user characteristics is further explained with reference to FIG. 2.

Figure 2:
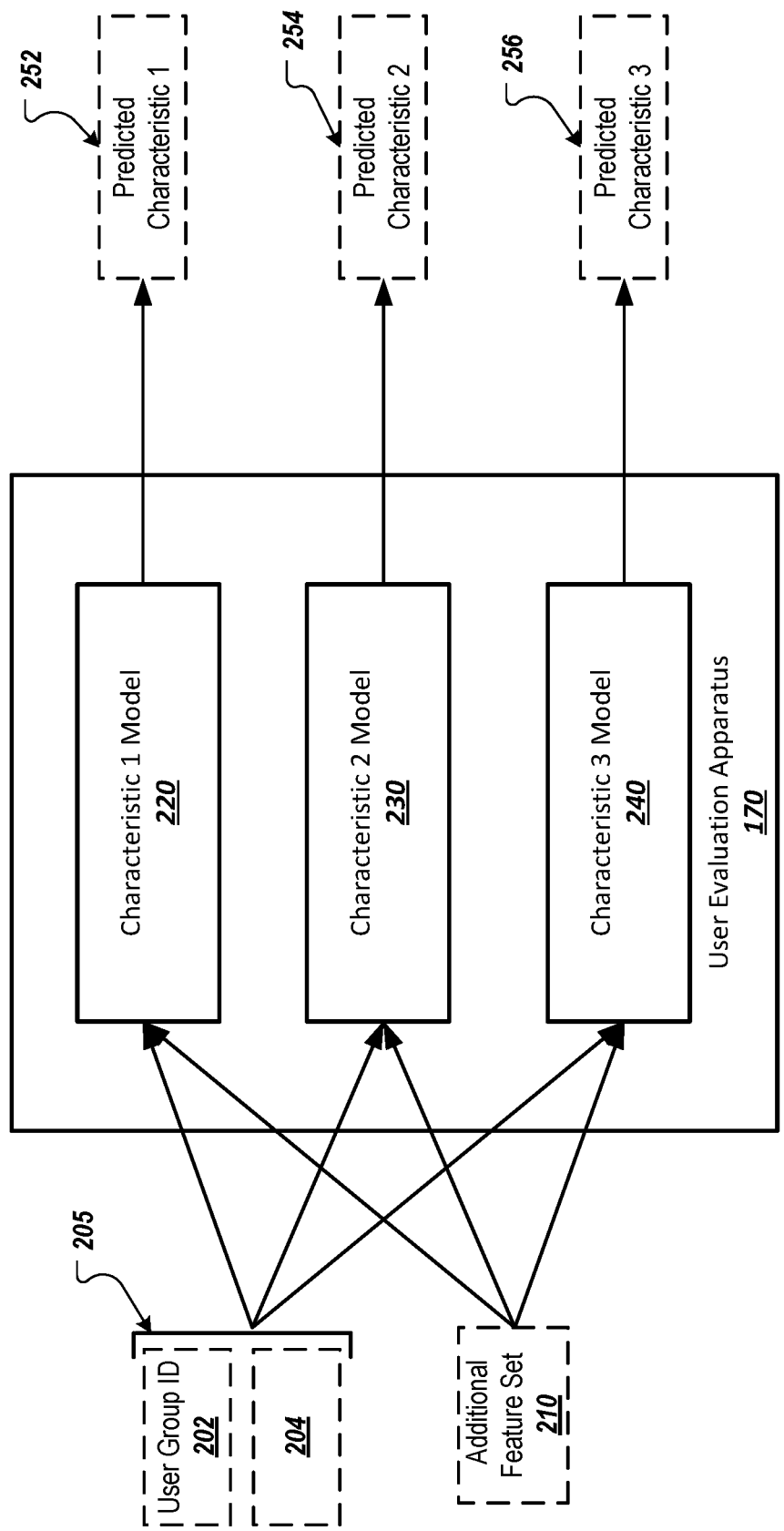
FIG. 2 is a block diagram of an example machine learning model implemented by the user evaluation apparatus.

FIG. 2 is a block diagram of an example machine learning model implemented within the user evaluation apparatus 170. In general, a machine learning model can be any technique deemed suitable for the specific implementation, such as an artificial neural network (ANN), support vector machine (SVM), random forest (RF) etc., that includes multiple trainable parameters. During the training process, the multiple training parameters are adjusted while iterating over the multiple samples of the training dataset (a process referred to as optimization) based on the measure of error generated by the loss function. The loss function compares the predicted attribute values of the machine learning model to the true value of the samples in the training set to generate an error metric, which the model is trained to minimize.

In some implementations, the machine learning model may include multiple sub-machine learning models (also referred to as "sub-models") such that each sub-model predicts a particular user characteristic (e.g., user demographic characteristic, user interest, or some other characteristic). For example, the user evaluation apparatus 170 includes three sub-models: (i) characteristic 1 model 220, (ii) characteristic 2 model 230 and (iii) characteristic 3 model 240. Each of these sub-models predicts the likelihood that a user has a different characteristic (e.g., demographic characteristic or user interest). Other implementations may include more or fewer individual sub-models to predict a system (or administrator) defined number of user characteristics.

In some implementations, the machine learning model can accept, as inputs, information included in the component request 112. As mentioned before, the component request 112 can include the user group identifier corresponding to the user group that includes the client device 106 and/or other information such as geographic information indicating a state or region from which the component request 112 was submitted, or other information that provides context for the environment in which the digital component 112 will be displayed (e.g., a time of day of the component request, a day of the week of the component request, a type of client device 106 at which the digital component will be displayed, such as a mobile device or tablet device). For example, the input 205 includes information that was included in the component request 112, i.e., the user group identifier (User Group ID) 202 and other information 204.

In some implementations, the machine learning model (or the sub-models) implemented within the user evaluation apparatus 170, can be further extended to accept additional inputs 210 related to the users current online activity. For example, the additional inputs can include a list of websites previously accessed by the user in the current session, prior interactions with digital components presented in previously accessed websites, or the predictions of other sub-models. The additional inputs may also include information related to the user group to which the user of the client device 106 is a member. For example, a similarity measure of web content accessed by users in the same user group, average predictions of user characteristics of users belonging to the same group, distribution of attributes across users in the same group, etc.

Depending on the particular implementation, the machine learning model (or each of the sub-models) can use one or more of the input features to generate an output including a prediction of one or more user characteristics. For example, the characteristic 1 model 220 may predict, as output, the predicted characteristic 1 252 (e.g., predicted gender) of the user of the client device 106. Similarly, the characteristic 2 model 230 may be regression model that processes the inputs 205 and 210 and generates, as output, the predicted characteristic 2 254 (e.g., predicted age range) of the user of the client device 106. In the same way, the characteristic model 3 240 generates, as output, a predicted characteristic 3 256 of the user.

These predicted user characteristics along with the input features 205 and 210 are used to select digital components provided by the digital component provider and/or server 108. However implementing a machine learning model (or each of the sub-models) by the user evaluation apparatus 170 to predict user characteristics may suffer from data class imbalance. Data class imbalance is the problem of predictive classification when there is an unequal distribution of classes in the training dataset. Since samples of the training dataset are acquired from the real world, the distribution of samples in the training dataset will reflect the distribution of classes according to the sampling procedure used to collect the data, and may not represent all classes uniformly. In other words, within a single user group (e.g., a user group including users interested in "shoes"), there can be subgroups of users also referred to as different groups of users, that have different characteristics (e.g., one subgroup of male users interested in shoes and a second subgroup of female users interested in shoes), and imbalance may result when there are different numbers of users in each of the subgroups in the training sample (e.g., more women than men, or vice versa).

Training machine learning models on such disproportionate data results in a tendency for the model to achieve better predictions on overrepresented groups, since the machine learning models are indiscriminative over the classes. For example, assume that the number of male users associated to a user group "cosmetics" is less than the number of female users associated to the same user group. In another example, assume that the number of users in the age group of 19-29 associated with the user group "video games" is significantly more than the number of users in the age group of 59-69. In such a scenarios, machine learning models implemented within the user evaluation apparatus 170 trained to predict user characteristics that do not take into count the distribution and/or proportion of the training samples, may result in a degradation of model performance for user groups that are under-represented in the training dataset. In other words, the prediction output by a model may be skewed toward characteristics of the subgroup of users having the most members in the training dataset. For example, assume that the true number of male users in the user group "Cosmetics" verses the true number of female users in the same user group is ¹/₁₀ i.e., 10% of the users in the user group "Cosmetics" are males. A machine learning model that is trained on a training dataset that shows the same male to female distribution as the true ratio, can classify all users in the user group as female and yet achieve an accuracy of 90%.

Training machine learning models on disproportionate data can also result in lower performances across different user groups. For example, assume that the machine learning model implemented within the user evaluation apparatus 170 is trained to predict user characteristics of users that belong to user groups 1 and 2. Also assume that 95% of the training samples represent users associated to user group 1. In such a scenario, the machine learning model can show a bias towards user characteristics that is generally common for user group 1 while predicting user characteristics for users associated to user group 2.

To address the issue of class imbalance, the machine learning model (or the sub-models) are trained to optimize a loss function that is modified by adding an additional term to the loss function that reduces differences in a measure of performance across different groups of users that are all represented by a same group identifier. In other words, the additional term in the loss function helps reduce the numbers of false positives and/or false negatives output by the model because of underrepresentation of any sub-group of users within a particular user group. For example, the additional term added to the modified loss function penalizes the machine learning model during the training process to update its learnable parameters in such a way that the model is able to distinguish between male and female users in the user group "Cosmetics" even though the training dataset has disproportionate number of male and female users and/or samples, thereby providing a more accurate output. In scenarios, where the loss function is modified by adding an additional term to provide consistent performances across different user groups, the additional term measures the variability of the model performance within each user group, thereby causing the model to achieve more consistent performance within each user group.

In some implementations, the additional term that is added to the loss function is an error regularization term that penalizes the machine learning model according to its error during the training process across multiple subgroups within a particular user group and/or multiple user groups such that the machine learning model generalizes over the distribution of the training dataset. In other implementations, the additional term that is added to the loss function is a divergence minimization term which penalizes the machine learning model if there is a difference between the distributions of the predicted output of the machine learning model across the different groups. The error regularization term and the divergence minimization term are further explained below.

In some implementations, the additional term that is added to the loss function is a loss variance term. In some implementations, the loss variance term is the squared difference in the loss of a first user in a first subgroup and the average loss of all users in all subgroups within the user group. For example, such an implementation would compute the variance of the average loss across different interest groups, such as "Cosmetics" and "Shoe". In such an example, the loss variance term accounts for the variability of the loss over the different interest groups, e.g. "Cosmetics" and "Shoe". The term would take a higher value when the variance over the different interest groups is high, thus encouraging more uniform performance across subgroups (measured by lower variance). The loss variance term is presented below $$L(X)+\mathrm{Var}(L)$$

where $$\mathrm{Var}(L)=E_{x\sim X}((L(x)-E[L(x)])^2)$$

and where $L(X)$ is the loss function across a data distribution X. Other variations of this loss variance formulation, where the variance is conditional on the true labels of each observation or a user attribute, are also possible.

In some implementations, the additional term that is added to the loss function is a maximum weighted loss discrepancy term. In some implementations, the maximum weighted loss discrepancy term is the maximum weighted difference in the loss of a user among all users in a subgroup within a particular user group and all users in all subgroups within the particular user group. In some implementations, the subgroups can be weighted based on the importance within the user group. The maximum weighted loss discrepancy term is presented below $$L(X)+w(g)|E[g(x)=1]-E(L(x))]|$$

where $g(x)$ is a function that indicates that a particular element is in a subgroup g, and $w(g)$ indicates a weighting function for group g.

In some implementations, the additional term that is added to the loss function is a coarse loss variance term. In some implementations, the coarse loss variance term is an average of squared difference between losses of the subgroups within the user group. The coarse loss variance term is presented below $$L(X)+\text{Var}(E_{x\sim X}[L(x)|A])$$

where $$\text{Var}(E_{x\sim X}[A])=E_{x\sim X}[(A)-E(L(x))^2]$$

where A is a subgroup with the user group.

In some implementations, the additional term that is added to the loss function is a Hilbert-Schmidt independence criterion (HSIC) regularization term. In some implementations, the HSIC measures the degree of statistical independence between the distribution of the predictions of a user attribute, and membership of examples in some group (e.g. an interest group, a demographic group). The HSIC regularization term is presented below $$\text{HSIC}(p_{xy},F,G)=\|C_{xy}\|_{HS}^2$$

where F and G are reproducing kernel hilbert spaces with joint measure $p_{xy}$, $C_{xy}$ is the cross-covariance operator, and $\|\cdot\|_{HS}$ is the Hilbert-Schmidt matrix norm (in this example, X and Y would be the model predictions and the group membership for a set of examples, respectively).

In some implementations, the additional term that is added to the loss function is a mutual information (MI) term. In some implementations, the mutual information term is a measurement of the similarity of the distributions of the models' predictions over different groups, such as the interest groups (e.g. a MI term may measure the degree of similarity between the overall distribution of the models' predictions for users in the Shoes and Cosmetics interest groups). The mutual information is presented below $$L(X)+MI(\text{logits}_T,\text{membership}_T)$$

In some implementations, the additional term that is added to the loss function is a Kullback-Leibler Divergence term. In some implementations, the Kullback-Leibler Divergence term is the measure of the difference in a distribution of machine learning model predictions across multiple subgroups of users that belong to the same user group. In some implementations, the Kullback-Leibler Divergence term can be presented as $$L(X)+KL(\text{logits}_A\|\text{logits}_B)$$

where the function KL is a continuous Kullback-Leibler Divergence for two subgroups A and B within an user group and the function KL for two distributions p and q can be written as $KL(p\|q)=\Sigma_x p(x)\log(p(x)/q(x))$.

After modifying the loss function for each of the sub-models 220, 230 and 240, the sub-models are trained on the training dataset. Depending on the specific implementation, the training process of the sub-machine learning model can be supervised, unsupervised, or semi-supervised and may also include adjusting multiple hyper-parameters associated with the model (process referred to as hyper-parameter tuning).

Once the machine learning model (or sub-models) is trained, the digital component distribution system 110 can select digital components based on the one or more user characteristics predicted by the user evaluation apparatus 170 (or the machine learning model implemented within the user evaluation apparatus 170). For example, assume that a male user belonging to the subgroup "Cosmetics", provides a search query "face cream" through the client device 106 to obtain a search results page and/or data specifying search results and/or textual, audible, or other visual content that is related to the search query. Assume that the search results page includes a slot for digital components provided by entities other than the entity that generates and provides the search results page. The browser based application 107 executing on the client device 106 generates a component request 112 for the digital component slot. The digital component distribution system 110 after receiving the component request 112, provides the information included in the component request 112 as input to the machine learning model that is implemented by the user evaluation apparatus 170. The machine learning model after processing the input, generates, as output, a prediction of one or more user characteristics. For example, the sub-machine learning model 220 correctly predicts the user of the client device 106 as a male, based on the parameters learned by optimizing over the modified loss function. The digital component provider 110 can therefore select digital components related to face creams that are specified for distribution to males. After selection, the selected digital components are transmitted to the client device 106 for presentation along with the search results in the search results page.

Figure 3:
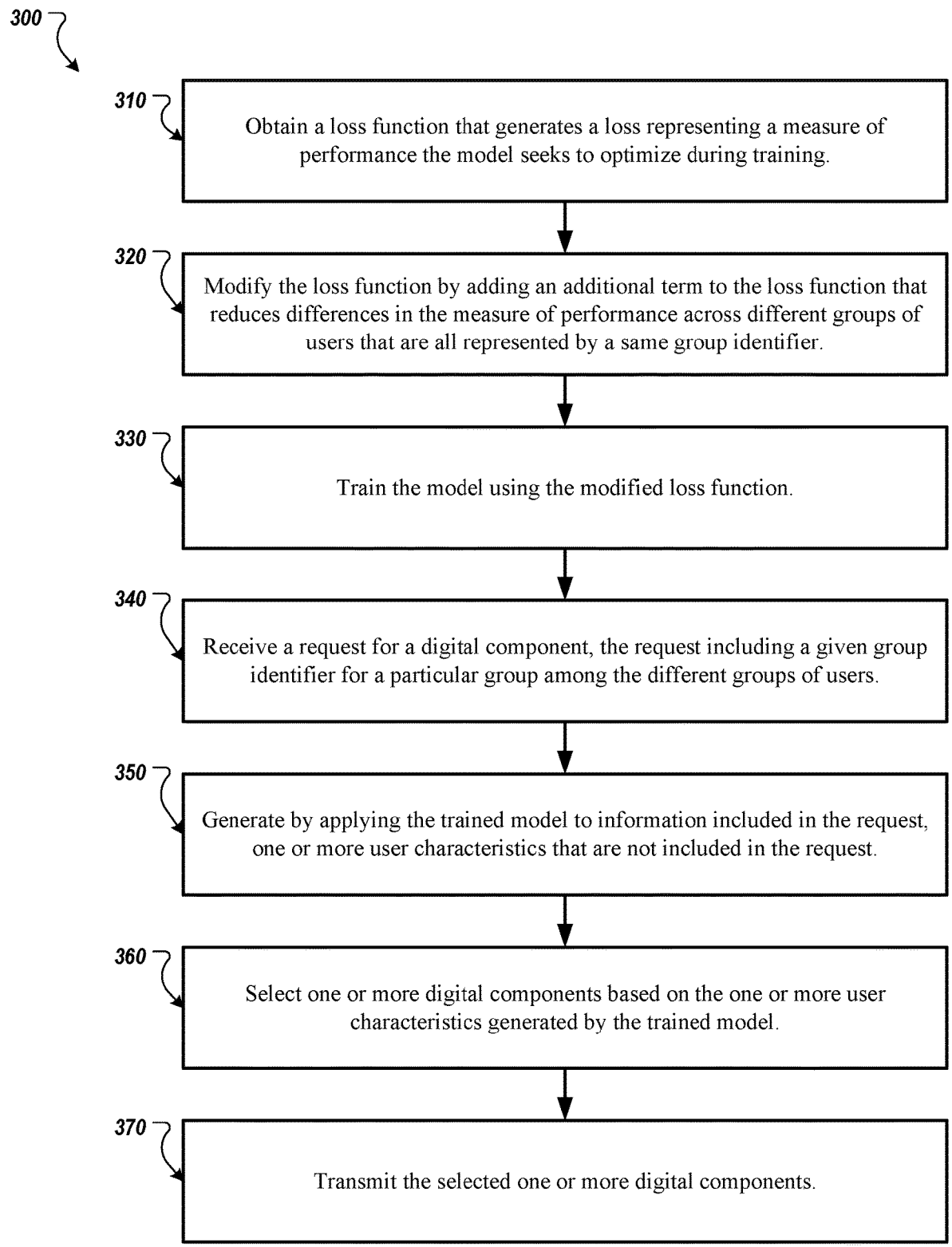
FIG. 3 is a flow diagram of an example process of distribution digital components using a modified loss function.

FIG. 3 is a flow diagram of an example process 300 of distributing digital components based on the modified loss function. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium that may be non-transitory. Execution of the instructions cause one or more data processing apparatus to perform operations of the process 300.

A loss function that generates a loss representing a measure of performance the model seeks to optimize during training is identified (310). In some implementations and as described with reference to FIGS. 1 and 2, the digital component distribution system 110 can include a user evaluation apparatus 170, that can implement a machine learning model (or multiple machine learning models referred to as sub-machine learning model) to predict user characteristics based on the information included in the component request 112. For example, the component request 112 includes the user group identifier corresponding to the user group to which the client device 106 is associated to besides other information such as geographic information indicating a country or region from which the component request 112 was submitted, or other information that provides context for the environment in which the digital component 112 will be displayed (e.g., a time of day of the component request, a day of the week of the component request, a type of client device 106 at which the digital component will be displayed, such as a mobile device or tablet device).

The loss function is modified (320). In some implementations, the loss function is modified by adding an additional term to the loss function that reduces differences in the measure of performance across different groups of users that are all represented by a same group identifier. To address the issue of class imbalance, the machine learning model (or the sub-machine learning models) are trained to optimize on a loss function that is modified by adding an additional term to the loss function that reduces differences in the measure of performance across different groups of users that are all represented by a same group identifier. The relative weighting between the two loss terms (the standard loss, and the additional term) can be adjusted by applying a multiplier to one or both terms separately.

In some implementations, the additional term that is added to the loss function is an error regularization term that penalizes the machine learning model for every wrong prediction during the training process across multiple subgroups within a particular user group such that the machine learning model generalizes over the distribution of the training dataset. In other implementations, the additional term that is added to the loss function is a divergence minimization term which penalizes the machine learning model if there is a difference between the distribution of the predicted output of the machine learning model and the ground truth. The error regularization term and the divergence minimization term is further explained below.

For example, the additional term can be a loss variance term which is the squared difference in the loss of a first user in a first subgroup and the average loss of all users in all subgroups within the user group. In another example, the additional term can be a maximum weighted loss discrepancy term which is the maximum weighted difference in the loss of a user among all users in a subgroup within a particular user group and all users in all subgroups within the particular user group. In another example, the additional term can be a coarse loss variance term which is an average of squared difference between the loss of the subgroups within the user group. In another example, the additional term can be a HSIC regularization term which is a difference in loss across different subgroups of users in a non-parametric way and independent of a distribution of users in the different subgroups of users. Similarly other additional terms can be a mutual information term and a Kullback-Leibler Divergence term which is the measure of the difference in a distribution of machine learning model predictions across multiple subgroups of users that belong to the same user group.

The model is trained using the modified loss function (330). For example, after modifying the loss function for each of the sub-machine learning models 220, 230 and 240, the sub-machine learning models are trained on the training dataset. Depending on the specific implementation, the training process of the sub-machine learning model can be supervised, unsupervised, or semi-supervised and may also include adjusting multiple hyper-parameters associated with the model (process referred to as hyper-parameter tuning).

A request for a digital component is received (340). In some implementations, the request includes a given group identifier for a particular group among the different groups of users. For example, if a user of the client device 106 uses a browser based application 107 to load a website that includes one or more digital component slots, the browser based application 107 can generate and transmit component request 112 for each of the one or more digital component slots, which can be received by the digital component distribution system 110.

The trained model is applied to information included in the request to generate one or more user characteristics that are not included in the request (350). For example, the digital component distribution system 110 after receiving the component request 112, provides the information included in the component request 112 as input to the machine learning model that is implemented by the user evaluation apparatus 170. The machine learning model, after processing the input, generates as output a prediction of one or more user characteristics.

One or more digital components are selected based on the one or more user characteristics generated by the trained model. (360). For example, assume that a male user belonging to the subgroup "Cosmetics", provides a search query "face cream" through the client device 106 to obtain a search results page and/or data specifying search results and/or textual, audible, or other visual content that is related to the search query. Assume that the search results page includes a slot for digital components. The browser based application 107 executing on the client device 106 generates a component request 112 for the digital component slot. The digital component distribution system 110, after receiving the component request 112, provides the information included in the component request 112 as input to the machine learning model that is implemented by the user evaluation apparatus 170. The machine learning model, after processing the input, generates as output a prediction of one or more user characteristics. For example, the sub-machine learning model 220 correctly predicts the user of the client device 106 as a male based on the parameters learned by optimizing over the modified loss function. The digital component provider 110 can therefore select digital components related to face creams that have distribution criteria indicating that the digital components should be distributed to males.

The selected one or more digital components are transmitted to the client device (370). For example, after selecting the digital components based on the predicted user characteristics by the digital component distribution system 110, the selected digital components are transmitted to the client device 106 for presentation.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
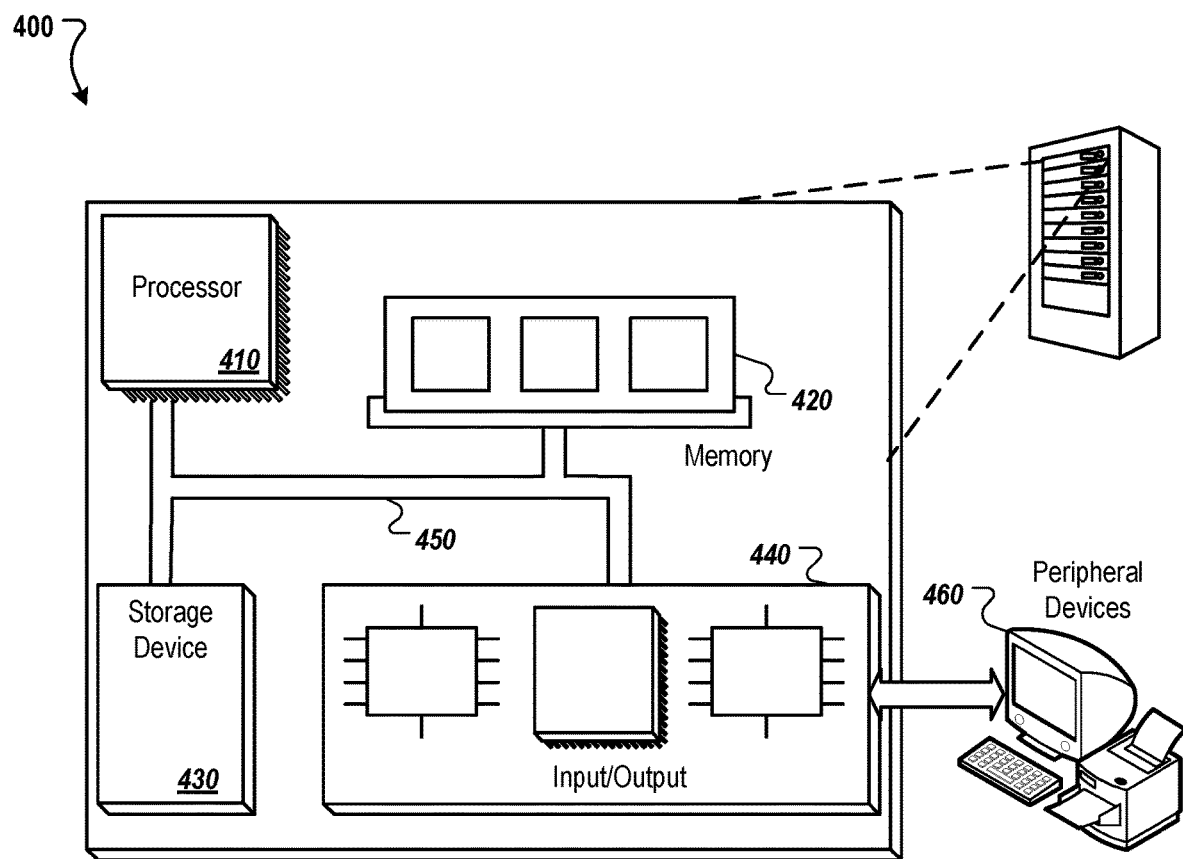
FIG. 4 is a block diagram of an example computer system that can be used to perform operations described.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 370. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
    identifying, for a model to be trained, a loss function that generates a loss representing a measure of performance the model seeks to optimize during training;
    modifying the loss function, including adding an additional term to the loss function that reduces differences in the measure of performance across different subgroups of users that are all represented by a same user group identifier, wherein each user subgroup among the different subgroups of users has a characteristic that differs from characteristics of other subgroup among the different subgroups of users;
    training the model using the modified loss function;
    receiving, from a client device, a request for a digital component, the request including a given user group identifier for a particular user group among the different subgroups of users;
    generating, by applying the trained model to information included in the request, one or more user characteristics that are not included in the request;
    selecting one or more digital components based on the one or more user characteristics generated by the trained model; and
    transmitting, to the client device, the selected one or more digital components.

2. The computer implemented method of claim 1, wherein modifying the loss function comprises adding an error regularization term to the loss function.

3. The computer implemented method of claim 2, wherein adding an error regularization term to the loss function comprises adding a loss variance term to the loss function, wherein the loss variance function is characterizing a squared difference between an average loss of the model within a user group based on some attribute, and the average loss of the model across all users, and wherein the difference may be computed separately across users based on a distinct attribute.

4. The computer implemented method of claim 2, wherein adding an error regularization term to the loss function comprises adding a maximum weighted loss discrepancy term to the loss function, wherein the maximum weighted loss discrepancy term is the maximum weighted difference between loss in a user group and all users in all the different subgroups of users, the method further comprising using a function that quantifies an importance of each user group.

5. The computer implemented method of claim 2, wherein adding an error regularization term to the loss function comprises adding a coarse loss variance term to the loss function, wherein the coarse loss variance term is an average of squared difference between loss of a first user group and a second user group, conditional on a separate user attribute.

6. The computer implemented method of claim 2, wherein adding an error regularization term to the loss function comprises adding a HSIC regularization term to the loss function, wherein the HSIC regularization term characterizes a difference in loss across different groups of users in a non-parametric way and independent of a distribution of users in the different groups of users.

7. The computer implemented method of claim 1, wherein modifying the loss function comprises adding a divergence minimization term to the loss function.

8. The computer implemented method of claim 7, wherein adding a divergence minimization term to the loss function comprises adding one of a mutual information term or a Kullback-Leibler Divergence term to the loss function, wherein the mutual information term characterizes a similarity of distributions of the model predictions across multiple groups of users and wherein the Kullback-Leibler Divergence term characterizes a difference in a distributions of model predictions across multiple groups of users.

9. A system, comprising:
a memory device; and
one or more data processing apparatus connected to the memory device and configured to execute instructions that cause the one or more data processing apparatus to perform operations comprising:
identifying, for a model to be trained, a loss function that generates a loss representing a measure of performance the model seeks to optimize during training;
modifying the loss function, including adding an additional term to the loss function that reduces differences in the measure of performance across different subgroups of users that are all represented by a same user group identifier, wherein each user subgroup among the different subgroups of users has a characteristic that differs from characteristics of other subgroup among the different subgroups of users;
training the model using the modified loss function;
receiving, from a client device, a request for a digital component, the request including a given user group identifier for a particular user group among the different groups of users;
generating, by applying the trained model to information included in the request, one or more user characteristics that are not included in the request;
selecting one or more digital components based on the one or more user characteristics generated by the trained model; and
transmitting, to the client device, the selected one or more digital components.

10. The system of claim 9, wherein modifying the loss function comprises adding an error regularization term to the loss function.

11. The system of claim 10, wherein adding an error regularization term to the loss function comprises adding a loss variance term to the loss function, wherein the loss variance function is characterizing a squared difference between an average loss of the model within a user group based on some attribute, and the average loss of the model across all users, and wherein the difference may be computed separately across users based on a distinct attribute.

12. The system of claim 10, wherein adding an error regularization term to the loss function comprises adding a maximum weighted loss discrepancy term to the loss function, wherein the maximum weighted loss discrepancy term is the maximum weighted difference between loss in a user group and all users in all the different subgroups of users, wherein the instructions cause the one or more data processing apparatus to perform operations further comprising using a function that quantifies an importance of each user group.

13. The system of claim 10, wherein adding an error regularization term to the loss function comprises adding a coarse loss variance term to the loss function, wherein the coarse loss variance term is an average of squared difference between loss of a first user group and a second user group, conditional on a separate user attribute.

14. The system of claim 10, wherein adding an error regularization term to the loss function comprises adding a HSIC regularization term to the loss function, wherein the HSIC regularization term characterizes a difference in loss across different groups of users in a non-parametric way and independent of a distribution of users in the different groups of users.

15. The system of claim 9, wherein modifying the loss function comprises adding a divergence minimization term to the loss function.

16. The system of claim 15, wherein adding a divergence minimization term to the loss function comprises adding one of a mutual information term or a Kullback-Leibler Divergence term to the loss function, wherein the mutual information term characterizes a similarity of distributions of the model predictions across multiple groups of users and wherein the Kullback-Leibler Divergence term characterizes a difference in a distributions of model predictions across multiple groups of users.

17. A non-transitory computer readable medium storing instructions that, when executed by one or more data processing apparatus, cause the one or more data processing apparatus to perform operations comprising:
identifying, for a model to be trained, a loss function that generates a loss representing a measure of performance the model seeks to optimize during training;
modifying the loss function, including adding an additional term to the loss function that reduces differences in the measure of performance across different subgroups of users that are all represented by a same user group identifier, wherein each user subgroup among the different subgroups of users has a characteristic that differs from characteristics of other subgroup among the different subgroups of users;
training the model using the modified loss function;
receiving, from a client device, a request for a digital component, the request including a given user group identifier for a particular user group among the different subgroups of users;
generating, by applying the trained model to information included in the request, one or more user characteristics that are not included in the request;

selecting one or more digital components based on the one or more user characteristics generated by the trained model; and transmitting, to the client device, the selected one or more digital components.

18. The non-transitory computer readable medium of claim 17, wherein modifying the loss function comprises adding an error regularization term to the loss function.

19. The non-transitory computer readable medium of claim 18, wherein adding an error regularization term to the loss function comprises adding a loss variance term to the loss function, wherein the loss variance function is characterizing a squared difference between an average loss of the model within a user group based on some attribute, and the average loss of the model across all users, and wherein the difference may be computed separately across users based on a distinct attribute.

20. The non-transitory computer readable medium of claim 18, wherein adding an error regularization term to the loss function comprises adding a maximum weighted loss discrepancy term to the loss function, wherein the maximum weighted loss discrepancy term is the maximum weighted difference between loss in a user group and all users in all the different subgroups of users, wherein the instructions cause the one or more data processing apparatus to perform operations further comprising using a function that quantifies an importance of each user group.

* * * * *